Oct. 18, 1949.　　　　　P. ROSEN　　　　　2,485,319
SANITARY MOUSE TRAP
Filed Sept. 24, 1947　　　　　　　　　　2 Sheets-Sheet 1

INVENTOR.
PAUL ROSEN
BY
ATTORNEY

Oct. 18, 1949. P. ROSEN 2,485,319
SANITARY MOUSE TRAP
Filed Sept. 24, 1947 2 Sheets-Sheet 2

INVENTOR.
PAUL ROSEN
BY
ATTORNEY

Patented Oct. 18, 1949

2,485,319

UNITED STATES PATENT OFFICE 2,485,319

SANITARY MOUSETRAP

Paul Rosen, West Orange, N. J., assignor of fifty per cent to Arthur Rosen and fifty per cent to Alice Gendel, both of West Orange, N. J.

Application September 24, 1947, Serial No. 775,773

4 Claims. (Cl. 43—61)

This invention relates to new and useful improvements in sanitary mouse traps.

The invention provides an elongate tiltable container closed at its bait-holding end and closable at its opposite end by a swinging door hung on a crank carrying a weight exterior to the container; with the arrangement of these parts such that, in combination with a transverse fulcrum or tilt member below the bottom of the container and with a stop for the weight to position it to hold the door open when the trap is set, setting of the trap disposes the door to provide a ramp beyond and leading toward the open end of the container, and predetermines that when a mouse after traversing the ramp and entering the container reaches the bait, the weight of the mouse will so tilt the chamber downward at its closed end that the crank-weight drops to close the container by upward swing of the door into the container's open end.

Thereby a very simple and inexpensive structure is provided, and one which not only has no springs or other movable parts in the container when the trap is set, to mangle the mouse, but which has a closing door so operating that there is absolutely no chance of such mangling incidental to closing of the door. Yet the action is instantaneous, and a mouse in the chamber nibbling at or approaching the bait will always be certainly trapped. Once trapped, there is no possibility of the mouse forcing the door open.

It is an object of the present invention to provide a mouse trap wherein the process of catching and disposing of the mouse does not require handling of the mouse or any contact with the mouse, dead or alive, and wherein the mouse will not be mangled upon being caught and consequently spread blood upon the floor, or the mangled carcass of the mouse will not remain lying on the floor for a considerable period of time thereby providing means upon which flies may feed and which may serve as a carrier of the disease infected mice germs to a child or adult or to their food by the spread of germs thereto.

It is another object of the present invention to provide a mouse trap of such construction that the mouse will, when caught, be contained within a container which can be picked up without placing the hand upon any part which has been contacted by the mouse; a trap, also, which can be readily up-ended, without having preliminarily to latch the door closed yet without any chance of the door opening and losing the mouse, for drowning the latter by flooding the container with water; and a trap, further, which can then be reversely up-ended for automatic opening of the door and discharge of the mouse with the water from the open end of the container.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
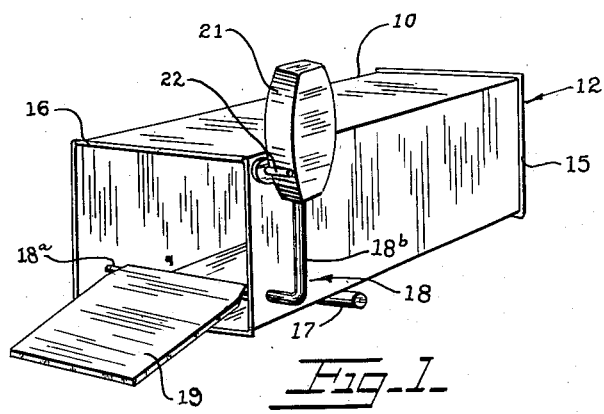
Fig. 1 is a perspective view showing an embodiment of the invention as now favored, with the trap set.

Referring to the drawings more in detail, the container, which may be made of thin metal or other suitable material, is indicated at 10; the same being shown as having side and top and bottom walls to provide an elongate chamber of square cross-section. The end of the chamber in which is deposited a suitable bait, as indicated at 11, is closed in any convenient way, as by an inserted and properly secured end-cap 12 having an offset flange 14 topped by a circumscribing bead 15. The other end of the container is open, and finished off with a similar bead 16.

For allowing tilt of the trap as aforesaid, a cut-off length of round-rod metal stock, to constitute a fulcrum member 17, is secured by soldering or spot welding to the underside of the bottom wall of the container 10, so as to be fixed thereunder as illustrated. The member 17 is arranged transverse to the length of the container, rather close to its open end, and so as to project (Figs.

4 and 6) to a greater distance beyond one side of the container than beyond the other side thereof so that the extended end can function as a stop as will become clear as this specification proceeds.

Near its open end and toward its bottom the container has aligned apertures through its side walls, for journalling the horizontal length 18ª of an L-shaped crank 18, such crank being of round-rod metal stock.

Figure 6:
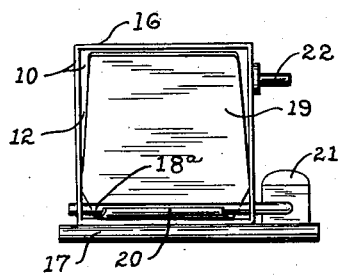
Fig. 6 is a view similar to Fig. 4, but with the parts arranged as in Fig. 5.

The crank 18 is permanently rotatively retained in place by having secured to its said length 18ª between the side walls of the container 10, as by spot welding, a curled lip formed at one end of the door 19. Such door is a flat piece of thin sheet metal, shaped in outline as shown in Fig. 6, where said lip is best shown, being there marked 20; so that when the door is closed as in this view, there will be spacing between the sides and top of the door and the interior of the container adequate for the ingress of mouse drowning flood water.

Beyond a side wall of the container 10, the crank 18 continues beyond its said length 18ª as a right-angularly offset length 18ᵇ carrying a lead or other suiable weight 21. When made of lead or other moldable material, the weight 21 is cast onto the free end portion of the crank length 18ᵇ, and securely anchored thereto as the result of previously roughening, blistering, bulging, crimping or otherwise deforming said end portion.

Spot welded or otherwise suitably secured to the same side wall of the container 10 which adjoins the field of swing of the weight 21, and for outward projection from said wall into said field of swing, is a stop 22, here shown as in the form of a pin having a basal flange.

Figure 2:
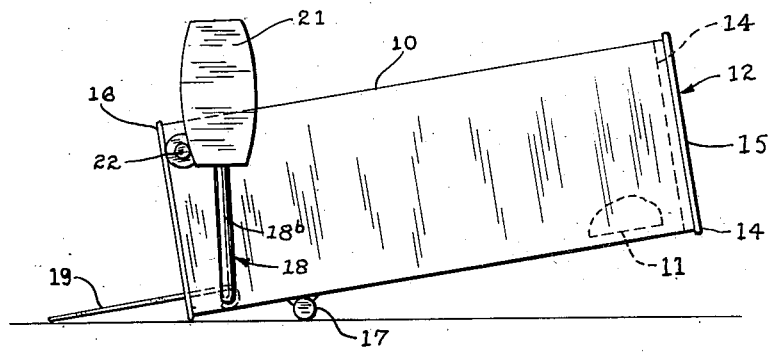
Fig. 2 is, on a somewhat enlarged scale, a side elevation of said embodiment, with the trap set.

*Operation.*—In setting the trap, only the exterior of the container 10, and the weight 21, need be handled; for placing the trap with its member 17 lowermost on a floor or the like, and for raising the weight 21 to drop the door 19 to constitute an entrance ramp as in Figs. 1 and 2. The weight 21 as so elevated, and engaging the stop 22, is now sufficiently offset forwardly from the vertical plane including the axis of the length 18ª of the crank 18 to prevent the weight of a mouse, shown in dotted lines 50 in Figs. 3 and 5, as the latter traverses the ramp constituted by the open door 19, for passage into the interior of the container 10, from rattling said door or disturbing it in any way. Deposit of the bait 11 in the container near its closed end, too, did not require other than external handling of the container, since the bait was merely dropped into the container through its open end while holding it somewhat down-tilted away from that end.

Figure 3:
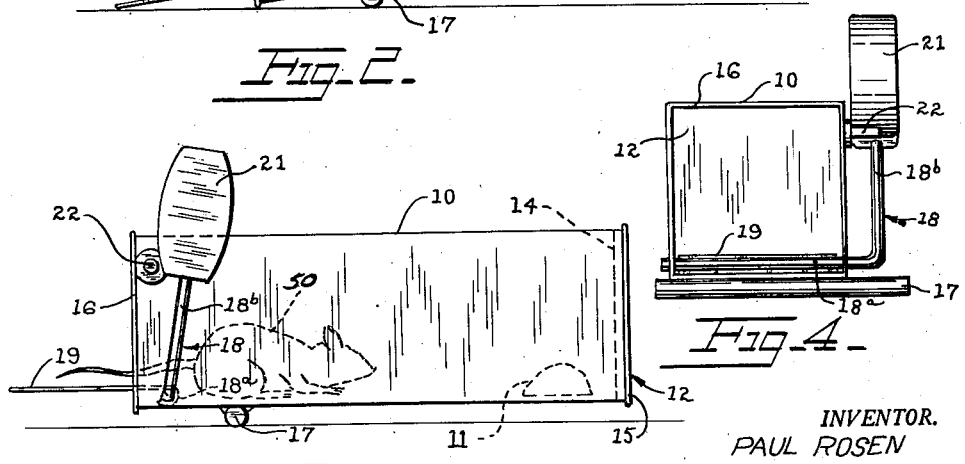
Fig. 3 is a similar view, showing the trap still set, but with the container having reached a horizontal position incidental to travel of a mouse part way into the container; this view to show the then disposition of the weight and the then still open condition of the door.
Figure 4:
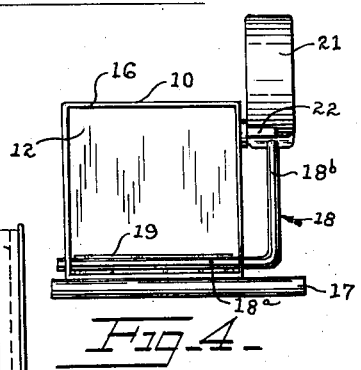
Fig. 4 is an end elevation, looking toward the open end of the container, that is, toward the right in Fig. 3, with the parts arranged as there shown.
Figure 5:
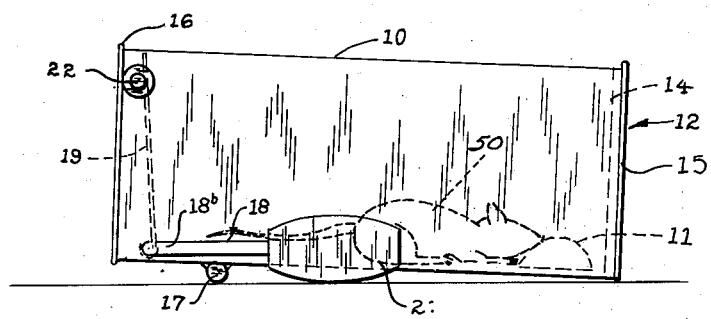
Fig. 5 is a view similar to Fig. 3, but with the container tilted down at its closed end by the weight of a contained mouse, to close the door.

The mouse on its way toward the bait 11 first causes the container 10 to come to the horizontal as in Fig. 3, at which instant the weight 21 moves past dead center to an extent to snap the container to the tilted position shown in Figs. 5 and 6, accompanied by a full dropping of the weight and a quick closing of the door 19.

Figure 7:
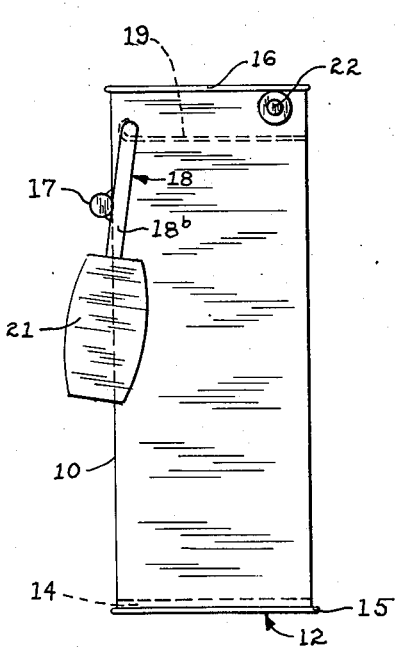
Fig. 7 is a side elevation of the trap, up-ended as above for flooding the same with water to drown a mouse caught therein.

Such dropped position of the weight is full notice that a mouse has been trapped; and the mouse is disposed of by up-ending the container 10 as in Fig. 7, to have the closed door uppermost but now held closed by abutment of the length 18ᵇ of the crank 18 against the more projected end of the member 17 which acts as the stop previously referred to, and flooding the container with water, as from a faucet, until the mouse is drowned. Even frantic struggles of the mouse to leap free of the water will not suffice to overcome the action of the weight 21 in holding the door 19 closed. When the mouse has been drowned, a reversal of the container to place the door lowermost causes automatic swinging of the weight 21 to open the door 19, whereupon the body of the mouse is ejected by gravity.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A sanitary mouse trap comprising a container having an open end and a closed end, a fulcrum member carried by the container below the same and intermediate its ends, a swinging door for closing the open end of the container, means including a crank for horizontally pivotally mounting said door near its bottom for allowing extension of the door as a ramp leading to the open end of the container when the latter is tilted up at its closed end, said crank having an arm exterior to the container, a weight means carried by said arm, said door being secured to said crank in an angular relation therewith such that when said arm is raised to dispose the center of gravity of the weight means forwardly of the vertical plane extending through the axis of swing of the door the latter is disposed as such ramp, and means limiting pivoting of said arm in a direction to raise the same to a position in which the weight means is disposed forwardly of said vertical plane.

2. A sanitary mouse trap comprising a container having an open end and a closed end, a fulcrum member carried by the container below the same and intermediate its ends, a swinging door for closing the open end of the container, means including a crank for horizontally pivotally mounting said door near its bottom and for allowing extension of the door as a ramp leading to the open end of the container when the latter is tilted up at its closed end, said crank having an arm exterior to the container, a weight means carried by said arm, said door being secured to said crank in an angular relation therewith such that when said arm is raised to dispose the center of gravity of the weight means forwardly of the vertical plane extending through the axis of swing of the door the latter is disposed as such ramp, and a stop on the exterior of the container for preventing movement of said weight means beyond a position to dispose its center of gravity slightly forward of the aforesaid vertical plane.

3. A sanitary mouse trap comprising a container having an open end and a closed end, a fulcrum member carried by the container below the same and intermediate its ends, a swinging door for closing the open end of the container, means including a crank for horizontally pivotally mounting said door near its bottom for allowing extension of the door as a ramp leading to the open end of the container when the latter is tilted up at its closed end, said crank having an arm exterior to the container, a weight means carried by said arm, said door being secured to said crank in an angular relation therewith such that when said arm is raised to dispose the center of gravity of the weight means forwardly of the vertical plane extending through the axis of swing of the door the latter is disposed as such ramp, and means limiting pivoting of said arm in a direction to raise the same to a position in which the weight means is disposed forwardly of said vertical plane, said crank being so arranged and so carrying its weight means and said fulcrum member being so placed that when a mouse nears the closed end of the container the latter is tilted down at said end, thereby to throw the weight means past dead center, whereby drop of the weight ensues to swing the door upward to close the open end of the container, said door being of such outline that there is sufficient spacing between the door when closed and the open end of the container to permit flooding of the latter when it is up-ended with the door uppermost, there being a stop extended from the exterior of the container into the path of swing of said arm and so located that when the container is thus up-ended said stop is engaged by said arm to prevent swinging of the weight means to allow opening of the door to an extent to permit escape of a mouse in the container.

4. A sanitary mouse trap comprising a container having an open end and a closed end, a fulcrum member carried by the container below the same and intermediate its ends, a swinging door for closing the open end of the container, means including a crank for horizontally pivotally mounting said door near its bottom for allowing extension of the door as a ramp leading to the open end of the container when the latter is tilted up at its closed end, said crank having an arm exterior to the container, a weight means carried by said arm, said door being secured to said crank in an angular relation therewith such that when said arm is raised to dispose the center of gravity of the weight means forwardly of the vertical plane extending through the axis of swing of the door the latter is disposed as such ramp, and means limiting pivoting of said arm in a direction to raise the same to a position in which the weight means is disposed forwardly of said vertical plane, said crank being so arranged and so carrying its weight means and said fulcrum member being so placed that when a mouse nears the closed end of the container the latter is tilted down at said end, thereby to throw the weight means past dead center, whereby drop of the weight ensues to swing the door upward to close the open end of the container, said door being of such outline that there is sufficient spacing between the door when closed and the open end of the container to permit flooding of the latter when it is up-ended with the door uppermost, there being a stop extended from the exterior of the container into the path of swing of said arm and so located that when the container is thus up-ended said stop is engaged by said arm to prevent swinging of the weight means to allow opening of the door to an extent to permit escape of a mouse in the container, said stop being an end portion of said fulcrum member.

PAUL ROSEN.

REFERENCES CITED

The following references are of record in the file of this patent:

UNITED STATES PATENTS

| Number | Name | Date |
|---|---|---|
| 506,951 | Stephens | Oct. 17, 1893 |
| 1,415,093 | Hurley | May 9, 1922 |